United States Patent
Besson

[11] 3,893,224
[45] July 8, 1975

[54] METHOD OF PRODUCING VACUUM-TIGHT SEALS BETWEEN CERAMIC AND ALLUMINUM COMPONENTS, EVACUATED ENVELOPES INCORPORATING THE COMPONENTS SEALED BY SAID METHOD, AND VACUUM TUBES INCORPORATING SAID ENVELOPES

[75] Inventor: André Besson, Paris, France
[73] Assignee: Thomson-CSF, Paris, France
[22] Filed: Oct. 31, 1972
[21] Appl. No.: 302,416

[30] Foreign Application Priority Data
Nov. 5, 1971  France .............. 71.39796

[52] U.S. Cl. .............. 228/124
[51] Int. Cl. .............. B23k 31/02
[58] Field of Search .......... 29/473.1, 504, 494, 495; 52/759; 403/179, 404

[56] References Cited
UNITED STATES PATENTS

| | | |
|---|---|---|
| 2,780,561 | 2/1957 | La Forge, Jr. .............. 29/473.1 UX |
| 2,820,534 | 1/1958 | Hume .............. 29/473.1 X |
| 3,006,069 | 10/1961 | Rhoads et al. .............. 29/473.1 |
| 3,402,458 | 9/1968 | Asaff.............. 29/473.1 X |
| 3,477,118 | 11/1969 | Terril.............. 29/473.1 X |
| 3,665,594 | 5/1972 | Raithel.............. 29/473.1 X |
| 3,678,568 | 7/1972 | Knippenberg et al. ........ 29/473.1 X |

OTHER PUBLICATIONS

Berg et al., "Ceramic to Aluminium Seal," RCA Technical Notes, RCA TN No. 124, received 3/58.
Brazing Manual, prepared by American Weldingg Society Committee on Brazing and Soldering, copyright 1963, pp. 130–143.

*Primary Examiner*—Ronald J. Shore
*Attorney, Agent, or Firm*—Roland Plottel

[57] ABSTRACT

A method of manufacturing vacuum-tight seals between ceramic and aluminium components: the two pieces to be sealed together, of ceramic (1) and aluminium (2), being tubular in form in the examples, are slid into one another, the insulating component (1) being lined over the full height (3) of the interfitting portion, with a metal deposit (4); the seal is produced by melting at a temperature of 580°C, the eutectic aluminium-silicon (89% Al – 11% Si) bead (7).

4 Claims, 2 Drawing Figures

METHOD OF PRODUCING VACUUM-TIGHT SEALS BETWEEN CERAMIC AND ALLUMINUM COMPONENTS, EVACUATED ENVELOPES INCORPORATING THE COMPONENTS SEALED BY SAID METHOD, AND VACUUM TUBES INCORPORATING SAID ENVELOPES

The present invention relates to a method of manufacturing vacuum-tight seals between aluminium and ceramic components.

The problem of manufacturing vacuum-tight bonds between insulating components and electrically conductive components, has long existed; it arose out of the need to produce vacuum-tight enclosures of all kinds, and has formed the subject of numerous solutions proposed in literature references. However, because of the particular application of many of these enclosures, which have frequently been intended for use as the envelopes of vacuum tubes and electronic tubes in particular, the result has been that at least, as far as the conductive components are concerned, there has hitherto been a restriction to a small number of materials, metals in fact such, for example, as copper, molybdenum, titanium, or alloys such as cupronickels or the alloy of iron, nickel and cobalt so well known in the technology of the manufacture of these tubes, under the commercial name of Kovar, for example.

By contrast, the use of aluminium as a material for the metal component has not been contemplated hitherto, as far as the applicant is aware, since a material of this kind, for a variety of reasons, is not very widely used, in particular in the aforementioned field of electronic tubes, this despite the obvious advantage of the inherent low weight of this metal.

The object of the present invention is a sealing technique applicable to this case.

According to the present invention there is provided a method of manufacturing vacuum-tight seals between ceramic and aluminium components, characterized in that it consists of the following operations:

the metallising, by one of the known techniques, of the ceramic component over at least part of the contact zone between said component and the aluminium component to which it is to be sealed;

the positioning of the aluminium component on the ceramic component;

the positioning, at the junction between the two components, of an appropriate quantity of brazing solder made up of a eutectic mixture of Al-Si containing 89% of aluminium and 11% of silicon;

the possible coating of said brazing solder with an appropriate quantity of flux;

the possible introduction of a collar at the location of said junction;

heating to 580°C in a controlled, reducing or neutral atmosphere;

elimination of the residual flux.

The invention will be better understood from a consideration of the ensuing description and the attached figures which illustrate two embodiments of ceramic-aluminium seals or bonds, produced in accordance with the method of the invention.

Figure 1:
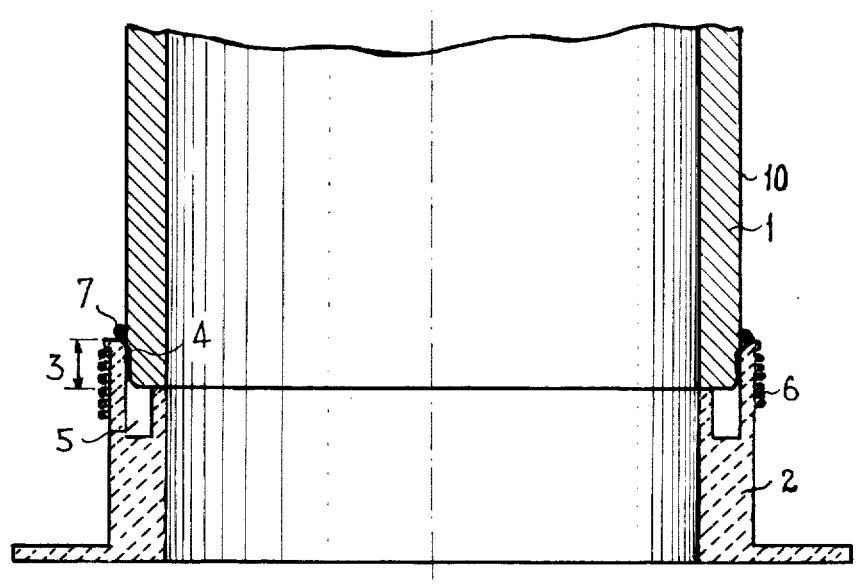
FIG. 1 is a sectional view illustrating one embodiment of the invention and in which an electrically conductive component is arranged outside an insulating component.

In the embodiment of FIG. 1, a ceramic component 1 can be seen which has the form of a tube cut at right-angles at one of its ends, whose external wall is marked 10. The tube 1 rests with said end on an aluminium component 2 having the form shown in the figure, which component is likewise tubular in the zone involved by the bond and is slid over the tube 1 for the height 3. Over the whole of this height, the wall 10 of the tube 1 is covered by a metallised coating, several layers for example, produced by conventional techniques. The external layer of this metallised coating is constituted by nickel. This metallised coating has been marked 4.

In accordance with a well known practive employed in the production of such seals or bonds, two arrangements are also provided in the case of the embodiment illustrated: at the end of the component 2 which is in contact with the component 1, there is formed within the thickness of said component 2 an undercut 5 designed to give said component more flexibility during the processes of expansion which it experiences whilst being brazed, this operation being referred to later on; around the component 2, there is a collar 6 designed to compensate for the differences in expansion between said component, which is made of aluminium, and the ceramic component 1 whose coefficient of expansion is, generally speaking, very much less than that of aluminium.

Said collar 6 consists, for example, of a wire having a coefficient of expansion in the same order as that of the ceramic of which the tube 1 is made, wound around the component 2 over a certain height, at the level of the junction between the components 1 and 2.

The brazing solder is applied in the form of a bead 7 for example, possibly coated with a flux at those of its parts which are sufficiently exposed to enable such flux to be removed after the brazing operation. The brazing solder 7 is constituted by a eutectic Al-Si structure, with 89% aluminium and 11% silicon.

The seal is produced by fusing the brazing solder bead 7, heating it to a convenient temperature by any known means, for example in an oven, by high-frequency loss heating, by electron-bombardment, etc. etc.; this heating takes place in a controlled, reducing or neutral atmosphere.

In the following, the characteristics of the embodiment shown in FIG. 1 have been listed:

The component 1, having an external diameter of 60 mm and a thickness of 4 mm, is constituted for 97% by alumina. The component 2 is of aluminium; it is slid over the component 1, for a height of approximately 5 mm. The collar 6 is constituted by a 0.5 mm diameter molybdenum wire. The brazing solder used is a eutectic Al-Si structure with 89% aluminium and 11% silicon, melting at 580°C, the solder being used in wire form. The metallisation of the ceramic component is produced by coating it with a suspension of molybdenum and manganese followed by calcining at a high temperature, around 1600°C, and electrolytic nickel-plating.

Figure 2:
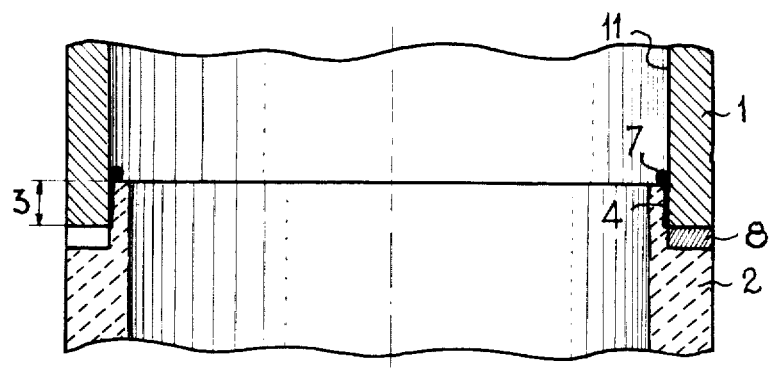
FIG. 2 is a sectional view similar to FIG. 1, but in which the insulating component is arranged outside the conductive component.

In a variant embodiment of the invention, shown in FIG. 2, the ceramic and aluminium components occupy the reverse position, in relation to one another, to that shown in the example of FIG. 1, the ceramic component in this case being arranged outside the aluminum component as the figure shows. The metallising 4 is arranged upon the internal wall 11 of the ceramic tube 1.

This arrangement makes it possible to do without the collar of the foregoing example (item 6 in FIG. 1), the ceramic component in this case performing the function of this collar.

In the case set out in this example, furthermore, a dismantable ring 8, in two (or more) parts, made of a material which cannot be soldered to the material used for the seal, that is to say to the eutectic Al-Si structure referred to hereinbefore, a material such as molybdenum for example, is provided between the two components as indicated in the figure; by withdrawing this ring after the sealing operation, access to the seal is achieved so that it can be more readily cleaned, in particular so that the final traces of flux, something which is always undesirable in vacuum tubes, can be eliminated.

In the examples described, the pieces being sealed together are tubular. However, it goes without saying that the method in accordance with the invention applies equally to the sealing, by means of the same brazing operation, of ceramic and aluminium components of all shapes, this utilising all the detailed arrangements relevant to the technique of sealing and appropriate to each particular case.

The sealing method in accordance with the invention is applicable to the production of sealed envelopes of all kinds, and more particularly to the production of vacuum tubes.

It is applicable in particular to the production of x-ray tubes comprising aluminium filters designed to eliminate the softest rays. These filters are, at the current state of the art, arranged outside the tubes. The method of the invention makes it possible to design them as an integral part of the envelopes of such tubes.

Recently, this process has also been utilised successfully in experimental designs of microwave tubes comprising envelopes made of a succession of ceramic and metal components. It has made it possible to use aluminium for the production of certain of these components and has consequently made it possible to lighten such tubes, a factor which is highly desirable in all cases where they are to be utilised in on-board equipment or airborne equipment where conditions of maximum weight apply.

What I claim is:

1. A method of manufacturing vacuum-tight seals between ceramic and aluminium components, comprising the steps of metallizing, the ceramic component over at least part of a contact zone between the ceramic component and the aluminium component;

positioning the aluminium component on the ceramic component;

positioning, at the junction between the two components, an appropriate quantity of brazing solder made of a eutectic mixture of Al-Si containing 89% of aluminium and 11% of silicon; and heating to 580°C in a controlled, reducing or neutral atmosphere.

2. A method as claimed in claim 1, characterized in that said ceramic component is constituted of 97% alumina, $Al_2O_3$.

3. A method according to claim 1 comprising the further steps of coating said brazing solder with an appropriate quantity of flux, and eliminating any residual flux after the heating step.

4. A method according to claim 1 comprising the step of introducing a collar in the vicinity of said junction.

* * * * *